2,921,048
Patented Jan. 12, 1960

2,921,048

ORGANIC PLASTICS CONTAINING N,N'-DIOLE-OYL POLYETHYLENE POLYAMINES OR RELATED COMPOUNDS

Alan Bell and Clarence E. Tholstrup, Kingsport, Tenn., assignors to Eastman Kodak Company, Rochester, N.Y., a corporation of New Jersey No Drawing. Application September 20, 1957
Serial No. 685,063

8 Claims. (Cl. 260—45.9)

This invention relates to the improved preparation of solid polyethylene, the solid isotactic polymers of mono-α-olefins such as polypropylene, poly-3-methylbutene-1, etc., cellulose acetate, cellulose acetate-butyrate, polyvinyl chloride, polyethylene-terephthalate, poly-1,4-cyclohexanediamethylene-terephthalate, polystyrene and any other organic plastic material which is normally subject to oxidative deterioration, has a tendency toward cohesion between flat surfaces in mutual contact, or is susceptible to acquiring a static electrical surface charge. Such organic plastics can have these deficiencies ameliorated by the practice of this invention.

In particular this invention relates to the employment of the newly discovered ameliorating agents in polyethylene or other solid isotactic polymers of mono-α-olefins. The benefits of this invention are especially noteworthy in films prepared from such organic plastics.

The problems involved in using various organic plastics have always been heightened by deterioration due to oxidation. Many stabilizers or antioxidants have been used or proposed for overcoming such degradation. Moreover, films or sheets of such plastics have ordinarily had a tendency to cohere so that a pile of sheets to be packaged together would form an undesirable block that was difficult to separate later into the individual sheets. The same applies to other flat surfaces in contact as when plastic tubing is rolled up and sticks together when unrolled so that the tubing is difficult to open up. Moreover, sheets, rolls of film, tubing, and various formed objects of organic plastics have had a tendency toward static electrical surface charges which creates difficulties in using such sheets, fibers, fabrics, tubing, shower curtains, photographic film, etc. Many additives have been proposed which serve as anti-blocking agents and numerous other compounds have been suggested for reducing static surface charge.

The present invention provides a most unusual advance in the art since a single ameliorating agent has now been discovered which is capable of overcoming all three of these undesirable characteristics of organic plastics.

It is an object of this invention to provide organic plastics which have improved stability toward oxidative deterioration especially at elevated temperatures.

It is another object to provide polyethylene and polymerized isotactic poly-α-mono-olefins which have excellent electrical characteristics which are maintained over extended periods of time at elevated temperatures.

It is a further object to provide photographic film supports from isotactic polymer such as polypropylene, polystyrene and also polyethylene terephthalate or poly-1,4-cyclohexylenedimethylene terephthalate which have reduced tendency toward acquisition of a static electrical surface charge. Moreover, it is also an object to provide this same advantage for finished photographic film having either black and white or color type emulsions and other coatings. It is another object to provide this advantage for any shaped organic plastic.

It is an additional object of this invention to provide sheets of organic plastics which are of greatly improved non-blocking characteristics. It is therefore an object to provide shaped articles of organic plastics which have a reduced tendency toward adherence between adjacent surfaces in mutual contact as in rolls of polystyrene film, or rolled tubing of cellulose acetate-butyrate, or stacks of polyethylene sheets, etc.

Another object is to provide a single ameliorating agent which can be incorporated into organic plastics suffering from the three described shortcomings so as to greatly improve the characteristics of the plastic material with regard to at least one of these shortcomings and generally in regard to all three.

Other objects will become apparent hereinafter.

These and other objects can be advantageously accomplished in accordance with a preferred embodiment of this invention which provides an article of manufacture shaped from an organic plastic material normally subject to oxidative degradation, susceptible to acquiring a static surface charge, or having a tendency toward cohesion between flat surfaces in mutual contact, which article is composed of said organic plastic material containing from about 0.0001% to about 5% by weight of an ameliorating agent having the following formula:

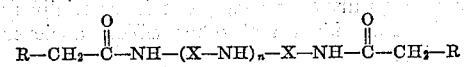

wherein each R represents a radical selected from the group consisting of alkyl and alkenyl radicals containing from 8 to 16 carbon atoms, each X represents an alkylene radical containing from 2 to 6 carbon atoms and $n$ represents an integer of from 1 to 4.

More particularly, an advantageous embodiment of this invention provides a sheet or film essentially composed of either polyethylene or an isotactic polymer of a mono-α-olefin containing from 2 to 8 carbon atoms such as polypropylene or polystyrene containing from about 0.001% to about 3% by weight of an ameliorating agent as defined above. Such a film is characterized by being substantially non-blocking, possessing a high degree of stability toward oxidative degradation, and having a low tendency toward developing a static electric surface charge as compared to such film wherein the ameliorating agent is absent.

This invention produces especially outstanding benefits as regards polyethylene film although film from any of the other organic plastics can be similarly benefited as described, especially isotactic polymers.

The proportions of ameliorating agent can be varied according to the results required depending upon the end use of the organic plastic. Generally a range of from 0.0001% to 5% covers about every practical proportion although higher and lower amounts can be employed. Ordinarily, 0.001% to 3% is a satisfactory range with especially useful results being achieved at from 0.01% to 2%.

The ameliorating agent can be added to the organic plastic in any obvious manner such as during the preparation of the plastic, or by milling it into the plastic on hot rolls, or by mixing it into dopes of a plastic such as cellulose acetate, or by coating it onto pellets of the plastic prior to extrusion as sheets or tubing, or by any other apparent means.

The organic plastic containing an ameliorating agent according to this invention can be melt extruded at high temperature such as at 150°–350° C. with greatly reduced tendency toward oxidative degradation. Film from such an extrusion can be cut into sheets and stacked, packaged and shipped without blocking. Tubing can be coiled and later unrolled and put to use without concern about getting it out of its collapsed condition. Photographic film base can be coated with subbings, silver halide emulsions and other layers with less difficulty regarding the effects of static electrical charges upon the emulsions. Electrical condensers can be manufactured and used at high equipment operating temperatures with less tendency toward deterioration of dielectric properties. Many other related advantages are apparent.

The organic plastics of this invention can also contain other agents as may be desired from a consideration of their end use such as coloring pigments, paraffin wax, plasticizers, other antioxidants such as zinc or cadmium dibutyldithiocarbamate, dodecyl gallate, 2-tert.butyl-4-octadecyloxyphenol, light stabilizers, oleamide, stearamide, ethylenedistearamide, silicone oils, polysiloxanes, etc.

The isotactic polymers of α-mono-olefins contemplated by this invention include those polymerized according to recently issued patents whereby a high percentage of isotactic linear polymeric molecules are formed, e.g., polypropylene, polystyrene, poly-3-methylbutene-1, poly-pentene-1, poly-3,3-dimethylbutene-1, poly-4-methylpentene-1, poly-4,4-dimethylpentene-1 including various mixtures and some copolymers. This invention also contemplates those atactic polymers such as peroxide catalyzed polyisobutylene copolymers, etc., but the advantages of this invention are generally limited in such cases primarily to an antioxidant effect.

As mentioned above, polyethylene is especially receptive to the antioxidant and other effects achieved by this invention.

In a common process of extruding molten polyethylene into film form, flakes or pellets of polyethylene are fed continuously into a melt extrusion machine, and the molten film continuously extruded through a slot orifice. Usually, the polyethylene is extruded from a melt maintained at a temperature of 150° to 325° C. Tubing is usually extruded from a melt at a temperature of within the range of from about 200° to 250° C. whereas film is extruded at a temperature of usually well above 200° C., e.g. at 250–325° C. Paper coating operations may be run at 300° C. or higher. An alternative process of forming a polyethylene film comprises milling molten polymer on closely spaced heated calendar rolls to form a film which is conducted vertically downward for further processing. In either of these general methods of forming a polymeric film, tubing or coating, the temperature employed might be advantageously increased so as to achieve increased rapidity in the processing operation whereby the cost of operations could be substantially reduced. However, degradation at high temperatures imposes limitations upon the temperatures which can be used.

Operations at high temperatures are limited by the necessity for shutting down the processing equipment for cleaning out the degraded products which accrue over a period of time at the high temperature employed. Obviously, it is not practical to operate at a temperature which requires frequent shut-downs. Similar considerations are involved in the molding of polyethylene and in other forming operations involving high temperatures.

In order to further illustrate, but not to limit this invention, various examples are presented such as in the table set forth below. A thermal stability test has been developed to serve as an accelerated procedure to measure the storage life of organic plastics at elevated temperatures. The oven storage life of the stabilized plastic containing an ameliorating agent is expressed in the table below as the number of hours at 140° C. before the peroxide build-up takes place in the sample being tested. The details of this procedure as it is applied to polyethylene or to other organic plastics can be described as follows wherein the ameliorating agents of this invention are referred to as antioxidants since this term appears to cover their principal function insofar as this particular test is concerned.

DESCRIPTION OF OVEN STABILITY TEST FOR POLYETHYLENE

Part A.—Preparation of master batch

A master batch of antioxidant-treated polyethylene is prepared by milling 1% by weight of the test antioxidant with polyethylene as follows: 148.5 grams polyethylene +1.5 grams antioxidant is milled on rollers maintained at 240° and 210° F. for six minutes, cutting, folding, and blending constantly to give a uniform sample. Other samples may be prepared by blending a portion of this master batch with untreated polyethylene to give a lesser antioxidant concentration. The polyethylene may be tested as it comes from the rollers or it can be pressed into $\frac{1}{16}$-inch plates at 140° C. getting rid of any air bubbles present and making it easier to handle.

Part B.—Measurement of thermal stability by oven stability test

Six 0.25-gram samples of the master batch are placed in a forced air oven heated to 140° C. throughout the test. At intervals one of these samples is removed and its peroxide content determined as follows: The 0.25-gram sample is finely chopped and placed in a 250-ml. Erlenmeyer flask containing 20 ml. carbon tetrachloride. The flask with its contents is then heated on a steam bath just below the boiling point for 25 minutes with frequent swirling. To this hot solution is added 20 ml. of a 60% glacial acetic acid/40% chloroform mixture. One ml. of a saturated aqueous potassium iodide is added, and the flask is then stoppered and agitated for 2 minutes in subdued light. Distilled water (100 ml.) is then added, and the iodine is titrated with 0.002 N sodium thiosulfate, using 2 ml. of starch indicator solution (1%). It is necessary to shake the sample well toward the end point. The peroxide content is then reported as the milliequivalents of peroxide per kilogram of sample. The calculations are as follows:

Milliequivalent peroxides $$= \frac{Ml. Na_2S_2O_3 \text{ solution} \times \text{normality} \times 1000}{\text{gram sample}}$$

$$= \frac{Ml. \times 0.002 \times 1000}{0.25} = Ml. \times 8$$

Upon completion of this test, the oven life "thermal stability" is measured as the number of hours before peroxides are first observed.

During the oven storage test of polyethylene samples three visual observations should be made: (1) the color of the polyethylene samples both before and during the test: (2) the viscosity breakdown, that is, the ability of the samples to contain themselves rather than to continually spread out at a thin film on the watchglasses: and (3) the solubility of the polyethylene samples in carbon tetrachloride during the peroxide test. These properties are particularly important since viscosity breakdown and poor solubility in carbon tetrachloride indicate that the initial start of peroxide build-up has been passed. When this occurs the peroxide value is usually low, because of the conversion to acids and other oxidation products.

Using the oven stability test described above, samples of various organic plastics have been tested and found to possess improved stability. The following table presents some results with regard to solid polyethylene of the type most commonly available.

| Additive | Percent Additive | Stability Test Data and Physical Properties of Polyethylene Film | | |
|---|---|---|---|---|
| | | Antioxidant Property | Antiblocking Property | |
| | | Oven Life (Hours at 140° C.) [1] | Of Film as it Comes off Film Extruder [2] | Of Film after Storage at 50° C. [3] |
| 1. Control | | 7 | Poor | Blocked. |
| 2. p-Cresol, 2,6-di-tert-butyl- | 1.00 | 10 | do | Do. |
| 3. Oleamide | 1.00 | 10 | do | Do. |
| 4. N,N'-Dioleoyldiethylenetriamine | 1.00 | 30 | Good | No blocking. |
| | 0.10 | 20 | do | Do. |
| | 0.05 | 12 | Fair | Do. |
| 5. N,N'-Dioleoyltetraethylenepentamine. | 0.10 | 17 | Good | Do. |

[1] Oven storage test as described above.
[2] This test is a visual observation.
[3] Test procedure same as that of the ASTM Designation: D884-48.

The antiblocking property of the compounds in this invention was found to be excellent. The test for the property of films as to whether they block or not is a visual observation. In this test batches of polyethylene containing one of the compounds of this invention were extruded in a film 3 mils thick. As the film comes off the machine it is checked visually as to its blocking property. A second part of this test was conducted according to the ASTM procedure D884-48 entitled "Estimating Blocking of Plastic Sheets." In this test two 3 x 5 inch sheets of film, 3 mils thick, are placed between two pieces of glass. This is then stored in an oven heated to 50° C. with a 12-lb. weight placed on top of the sample. At the end of 24 hours the sample is removed and the films checked for ease of separation. A sample which separates easily is considered to be nonblocking. The results of these observations are shown in the above table.

The above table shows comparative results using 2,6-ditert.butyl-p-cresol (often referred to as BHT) and also using oleamide. Both of these are common additives to polyethylene and serve to form a realistic comparative basis for evaluating the unobviousness of the great improvement achieved by the present invention. Results of similar nature can be demonstrated in regard to other organic plastics as discussed hereinabove, especially polypropylene and other isotactic poly-α-mono-olefins.

The preparation of the ameliorating agents described herein can be accomplished using those procedures illustrated by the synthesis of N,N'-dioleoyl diethylenetriamine in which 2 moles of oleic acid are reacted with 1 mole of diethylenetriamine at 180° C. until 2 moles of water has evolved. The product is then crystallized from acetone yielding a waxy material, off white in color, with a melting point ranging from 60 to 66° C. In the naming of these compounds, N and N' refer to substituents on the terminating nitrogen atoms.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. An article of manufacture shaped from an organic plastic material selected from the group consisting of polyethylene and polypropylene normally subject to oxidative degradation characterized by at least one of the following two additional properties: (1) being susceptible to acquiring a static surface charge and (2) having a tendency toward cohesion between flat surfaces in mutual contact, which article is composed of said organic plastic material containing from about 0.0001% to about 5% by weight of an ameliorating agent having the following formula:

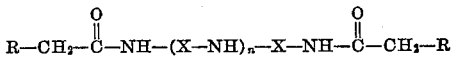

wherein each R represents a radical selected from the group consisting of alkyl and alkenyl radicals containing from 8 to 16 carbon atoms having no more than one olefinic bond, each X represents an alkylene radical containing from 2 to 6 carbon atoms and $n$ represents an integer of from 1 to 4.

2. An article as defined in claim 1 wherein the organic plastic is solid polyethylene and the ameliorating agent is N,N'-dioleoyldiethylenetriamine.

3. An article as defined in claim 1 wherein the organic plastic is solid polyethylene and the ameliorating agent is N,N'-dioleoyltetraethylenepentamine.

4. An article as defined in claim 1 wherein the organic plastic is solid polyethylene and the ameliorating agent is N,N'-distearyldiethylenetriamine.

5. A film essentially composed of a member selected from the group consisting of polyethylene and an isotactic polymer of poly-propylene containing from about 0.001% to about 3% by weight of an ameliorating agent having the following formula:

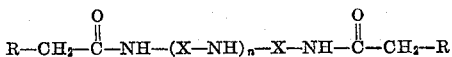

wherein each R represents a radical selected from the group consisting of alkyl and alkenyl radicals containing from 8 to 16 carbon atoms having no more than one olefinic bond, each X represents an alkylene radical containing from 2 to 6 carbon atoms and $n$ represents an integer of from 1 to 4, which film is characterized by being substantially non-blocking, possessing a high degree of stability toward oxidative degradation, and having a low tendency toward developing a static electric surface charge as compared to such film wherein the ameliorating agent is absent.

6. A film as defined in claim 5 wherein the polymer is polyethylene and the ameliorating agent is N,N'-dioleoyldiethylenetriamine.

7. A film as defined in claim 5 wherein the polymer is polyethylene and the ameliorating agent is N,N'-dioleoyltetraethylenepentamine.

8. A film as defined in claim 5 wherein the polymer is polyethylene and the ameliorating agent is N,N'-distearyldiethylenetriamine.

References Cited in the file of this patent

UNITED STATES PATENTS 2,765,293    Happoldt _____ Oct. 2, 1956